US011111979B2

(12) United States Patent
Howard et al.

(10) Patent No.: US 11,111,979 B2
(45) Date of Patent: Sep. 7, 2021

(54) ELASTOMERIC ARTICLES WITH IMPROVED FIRE PROTECTION PROPERTIES

(71) Applicant: Firestone Industrial Products Company, LLC, Nashville, TN (US)

(72) Inventors: Michael C. Howard, Noblesville, IN (US); Brandon C. Adcock, Nashville, TN (US); Hang Li, Copley, OH (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 16/332,855

(22) PCT Filed: Sep. 18, 2017

(86) PCT No.: PCT/US2017/052006
§ 371 (c)(1),
(2) Date: Mar. 13, 2019

(87) PCT Pub. No.: WO2018/053395
PCT Pub. Date: Mar. 22, 2018

(65) Prior Publication Data
US 2019/0249741 A1 Aug. 15, 2019

Related U.S. Application Data

(60) Provisional application No. 62/396,132, filed on Sep. 17, 2016.

(51) Int. Cl.
*F16F 9/04* (2006.01)
*C08L 11/00* (2006.01)
(Continued)

(52) U.S. Cl.
CPC .............. *F16F 9/0409* (2013.01); *C08K 3/04* (2013.01); *C08K 3/22* (2013.01); *C08K 3/346* (2013.01);
(Continued)

(58) Field of Classification Search
CPC .... F16F 9/0409; F16F 9/04; F16F 9/38; F16F 1/3605; C08K 3/04; C08K 2003/2227;
(Continued)

(56) References Cited

U.S. PATENT DOCUMENTS 5,527,170 A * 6/1996 Graves .................. B29C 33/505
264/315
6,439,550 B1 * 8/2002 Koch ....................... C08J 5/124
156/314

(Continued)

FOREIGN PATENT DOCUMENTS

| CN | 103 707 579 A | 4/2014 |
| DE | WO-2016045813 A1 * | 3/2016 |
| EP | 1 484 525 A2 | 12/2004 |

OTHER PUBLICATIONS

International Search Report and Written Opinion for corresponding PCT/US2017/052006 dated Dec. 7, 2017.

*Primary Examiner* — Pamela Rodriguez
(74) *Attorney, Agent, or Firm* — Thomas R. Kingsbury; Arthur M. Reginelli

(57) ABSTRACT

An air spring having an airsleeve, wherein at least one layer of the airsleeve includes the vulcanization product of a composition that includes at least one vuicanizable polymer, a curative, at least one halogenated hydrocarbon wax, and expandable graphite.

19 Claims, 5 Drawing Sheets

(51) Int. Cl.
  *C08K 3/04* (2006.01)
  *C08K 3/22* (2006.01)
  *C08K 3/34* (2006.01)
  *C08K 3/36* (2006.01)
  *C08K 5/02* (2006.01)
  *C08L 7/00* (2006.01)
  *C08L 9/06* (2006.01)
  *C08L 15/00* (2006.01)
  *C08L 23/16* (2006.01)
  *F16F 1/36* (2006.01)
  *F16F 9/38* (2006.01)

(52) U.S. Cl.
  CPC ............... *C08K 3/36* (2013.01); *C08K 5/02* (2013.01); *C08L 7/00* (2013.01); *C08L 9/06* (2013.01); *C08L 11/00* (2013.01); *C08L 15/00* (2013.01); *C08L 23/16* (2013.01); *F16F 1/3605* (2013.01); *F16F 9/04* (2013.01); *F16F 9/38* (2013.01); *C08K 2003/2227* (2013.01); *C08K 2003/2296* (2013.01)

(58) Field of Classification Search
  CPC . C08K 3/22; C08K 3/346; C08K 3/36; C08K 5/02; C08K 2003/2296; C08L 9/06; C08L 11/00; C08L 15/00; C08L 23/16; C08L 7/00
  USPC .............. 267/64.27, 64.21, 64.24; 264/239
  See application file for complete search history.

(56) References Cited

U.S. PATENT DOCUMENTS

| | | | |
|---|---|---|---|
| 7,250,203 B2* | 7/2007 | Kerstetter, III | B32B 25/10 428/36.91 |
| 10,144,794 B2* | 12/2018 | Chen | C08L 91/00 |
| 2004/0226100 A1* | 11/2004 | Small, Jr. | D06M 15/263 5/698 |
| 2004/0248485 A1 | 12/2004 | Kerstetter, III | |
| 2006/0229404 A1* | 10/2006 | Lechtenboehmer | C08K 3/04 524/495 |
| 2007/0009723 A1 | 1/2007 | Ogawa et al. | |
| 2008/0111288 A1 | 5/2008 | Howard et al. | |
| 2010/0117274 A1* | 5/2010 | Agarwal | F16F 9/0409 267/64.27 |
| 2010/0183856 A1* | 7/2010 | Kind | F16F 9/0409 428/212 |
| 2013/0231426 A1* | 9/2013 | Chen | C08L 9/06 524/269 |
| 2014/0013693 A1 | 1/2014 | Zhou et al. | |
| 2014/0217656 A1 | 8/2014 | Agarwal | |
| 2015/0167771 A1 | 6/2015 | Agarwal et al. | |
| 2016/0153513 A1 | 6/2016 | Nieten | |

\* cited by examiner

ELASTOMERIC ARTICLES WITH IMPROVED FIRE PROTECTION PROPERTIES

This application is a National-Stage application of PCT/US2017/052006 filed on Sep. 18, 2017, which claims the benefit of U.S. Provisional Application Ser. No. 62/396,132 filed on Sep. 17, 2016, which are incorporated herein by reference.

FIELD OF THE INVENTION

Embodiments of the present invention are directed toward elastomeric articles, and more particularly the bellows of air springs, that have improved fire properties. Embodiments exhibit improvement in one or more of smoke density, smoke toxicity, and heat release, when subjected to a fire event.

BACKGROUND OF THE INVENTION

Air springs, or pneumatic suspension devices, have long been used as part of a vehicle's suspension. In an air spring, a volume of gas, usually air, is confined within a flexible container, which may be called a bellow or an airsleeve.

Elastomeric articles such as air springs airsleeves may undergo countless cycles between compression and extension, and must be flexible and durable. Typically, the air spring bellows or airsleeve is made of cord-reinforced rubber compositions, which may be natural or synthetic materials.

Efforts have been made to improve the flame retardancy of airspring airsleeves, in particular to meet the requirements for fire protection in European Standard EN 45545, "Railway Applications—Fire Protection on Railway Vehicles." This standard imposes stringent requirements on heat release, smoke density, and smoke toxicity and flame spread properties allows for materials used in railway applications.

International Patent Application Publication No. WO 2016/045813 A1, to Contitech Luftfedersysteme GMBH, teaches an air spring bellows with a cover formed from a textile structure and/or a shrink film, where the cover includes a flame retardant such as expandable graphite. Other flame retardants are suggested, including aluminum hydroxide.

U.S. Patent Application Publication No. 2010/0183856 A1 (equivalent to EP 2196492), to Trelleborg Industrial Products UK Ltd., teaches an elastomeric body suitable for anti-vibration and suspension, characterized in that said body comprises at least one layer of an elastic and flexible fire retardant coating covering at least a portion of said body. The layer of fire retardant coating is non-halogenated and comprises a fire retardant substance and an elastic binder material. The fire retardant may include expandable graphite, aluminum trihydrate, or montmorillonite clay, among others.

It is particularly challenging to manufacture articles that meet the fire protection standards and that have good mechanical properties and processability. There remains a need in the market for compositions for airsleeve having improved fire protection properties, and also having good dynamic and mechanical properties.

DETAILED DESCRIPTION OF ILLUSTRATIVE EMBODIMENTS

Embodiments of the present invention are based upon the discovery of air spring bellows with improved fire protection properties including one or more of reduced smoke density, smoke toxicity, and heat release when subjected to a fire event. The bellows include a halogenated hydrocarbon wax and expandable graphite dispersed within a rubber matrix. It is believed that the expandable graphite and the halogenated hydrocarbon wax provide a synergistic combination that leads to these advantageous results. It has unexpectedly been discovered that air bellows prepared according to the present invention have improved fire performance, as well as good mechanical and chemical properties, including improved flexibility and durability.

I. Airspring

Figure 1:
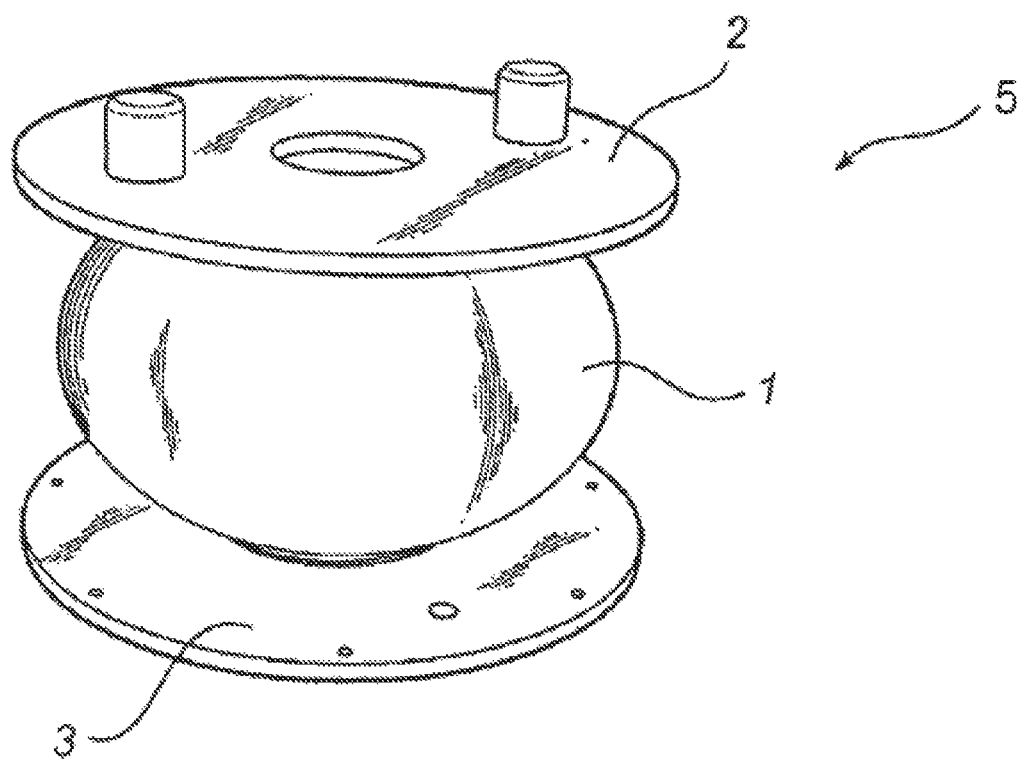
FIG. 1 is a perspective view of a suspension product in the form of an elastomeric spring.

The figures show various embodiments of air springs. A suspension product in the form of an elastomeric spring 5 is shown in FIG. 1. The elastomeric spring comprises a flexible airsleeve 1 and metal plates 2, 3. Metal plates 2, 3 may be used to fasten the flexible airsleeve 1 to the surroundings.

Figure 2:
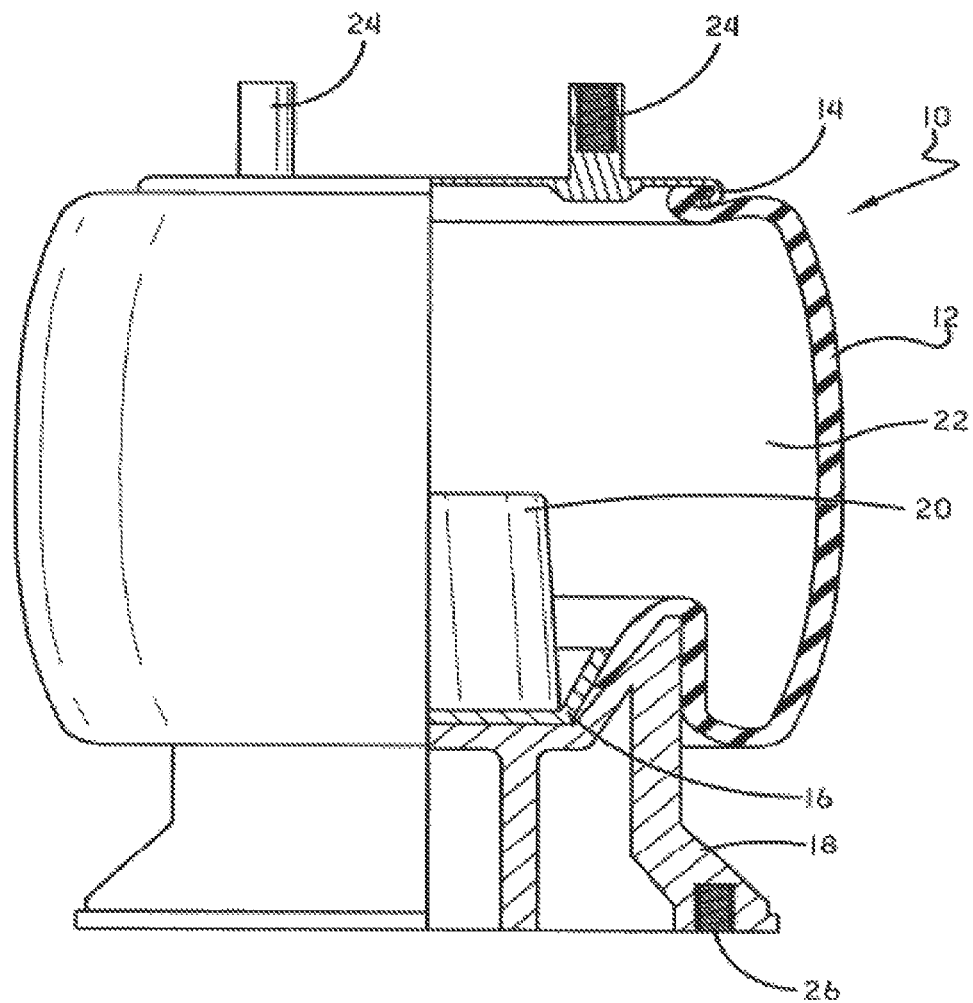
FIG. 2 is a perspective view of an exemplary air spring according to one or more embodiments of the present invention.

In FIG. 2, an air spring assembly is designated generally by the numeral 10. The air spring assembly 10 includes flexible airsleeve 12, which may also be referred as bellow 12. Bead plate 14 is crimped to airsleeve 12 to form an airtight seal between bead plate 14 and airsleeve 12. Similarly, end closure 16 is molded to flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for flexible airsleeve 12 to roll on during compressive (jounce) travel. Flexible air spring assembly 10 may optionally include bumper 20 to support the vehicle when there is no air in the air springs or during extreme road disturbances. Enclosed within airsleeve 12 is a volume of gas 22. Studs 24 and hole 26 are used to secure the flexible air spring assembly 10 to the mounting surface of an automobile (not shown).

Figure 3:
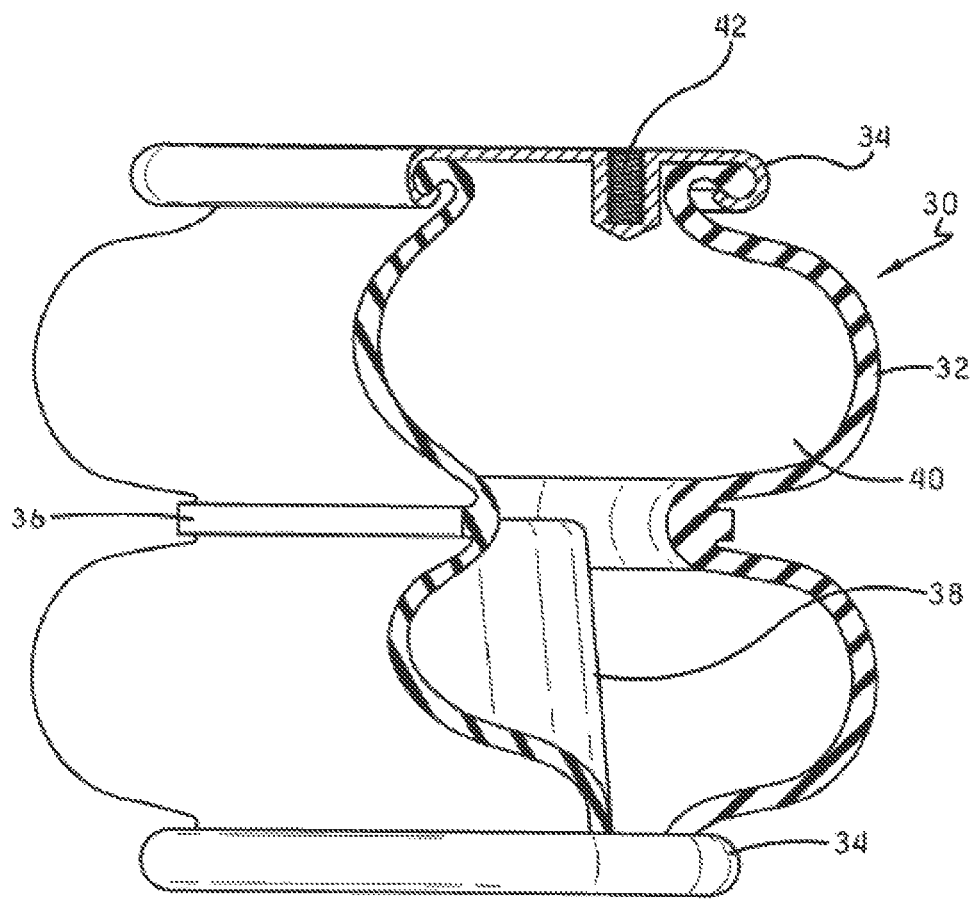
FIG. 3 is a perspective view of an exemplary air spring according to one or more embodiments of the present invention.

FIG. 3 shows an exemplary (double) convoluted air spring assembly designated generally by the numeral 30. Convoluted air spring assembly 30 includes flexible airsleeve 32. Bead plates 34 are crimped to airsleeve 32 to form an airtight seal between bead plates 34 and airsleeve 32. A girdle hoop 36 is affixed to airsleeve 32 between bead plates 34. Convoluted air spring assembly 30 may optionally include bumper 38 to support the vehicle when there is no air in the air springs or during extreme road disturbances. Enclosed within airsleeve 32 is a volume of gas 40. Blind nuts, including 42 and other blind nuts (not shown), are used to secure the convoluted air spring assembly 30 to the mounting surface of an automobile (not shown).

Figure 4:
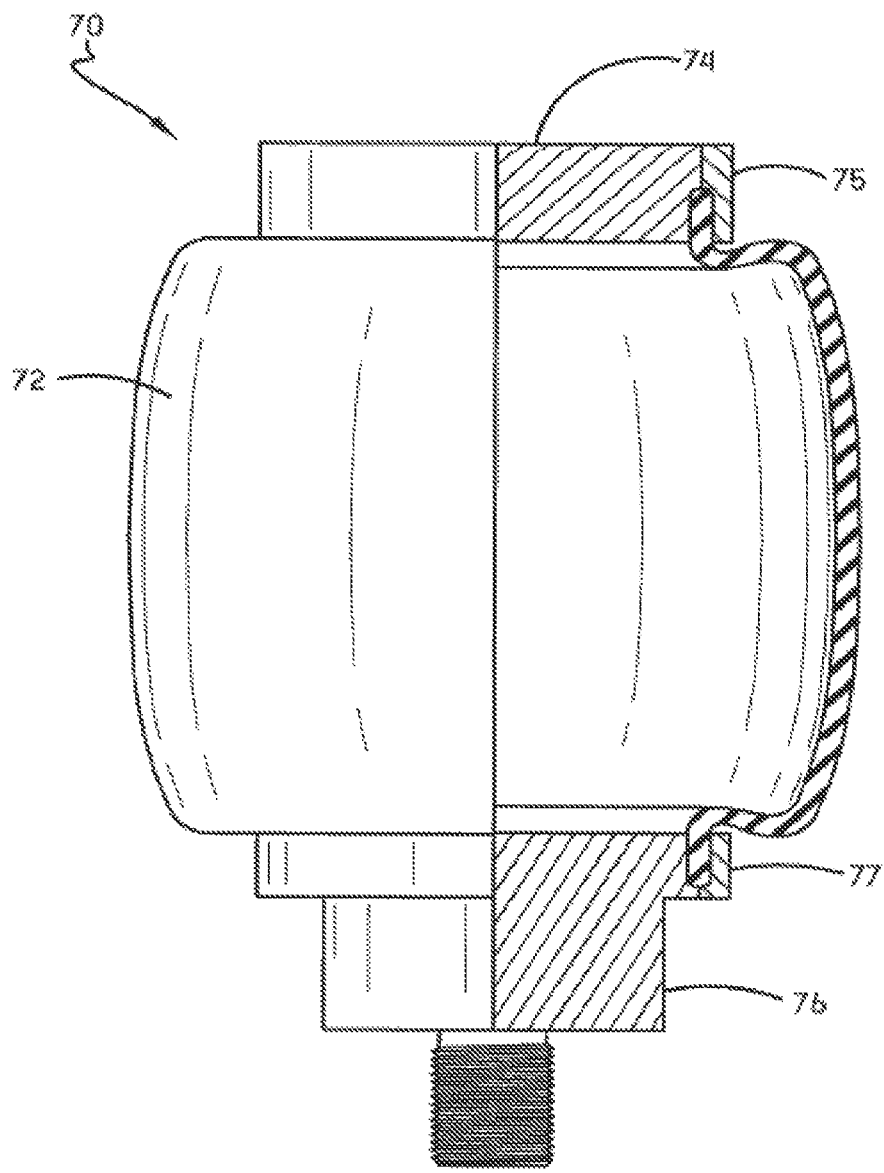
FIG. 4 is a perspective view of an exemplary air spring according to one or more embodiments of the present invention.

FIG. 4 shows an exemplary cab/seat spring assembly designated generally by the numeral 70. Cab/seat spring assembly 70 includes flexible air sleeve 72. Cab/seat plate 74 is attached to air sleeve 72 to form an air tight seal there between by using, for example, metal ring 75. An airtight seal can be made using known techniques such as those described in U.S. Pat. No. 6,474,630, which is incorporated herein by reference. Suspension plate 76 is likewise secured to airsleeve 72 via metal ring 77 to form an airtight seal there between.

Figure 5:
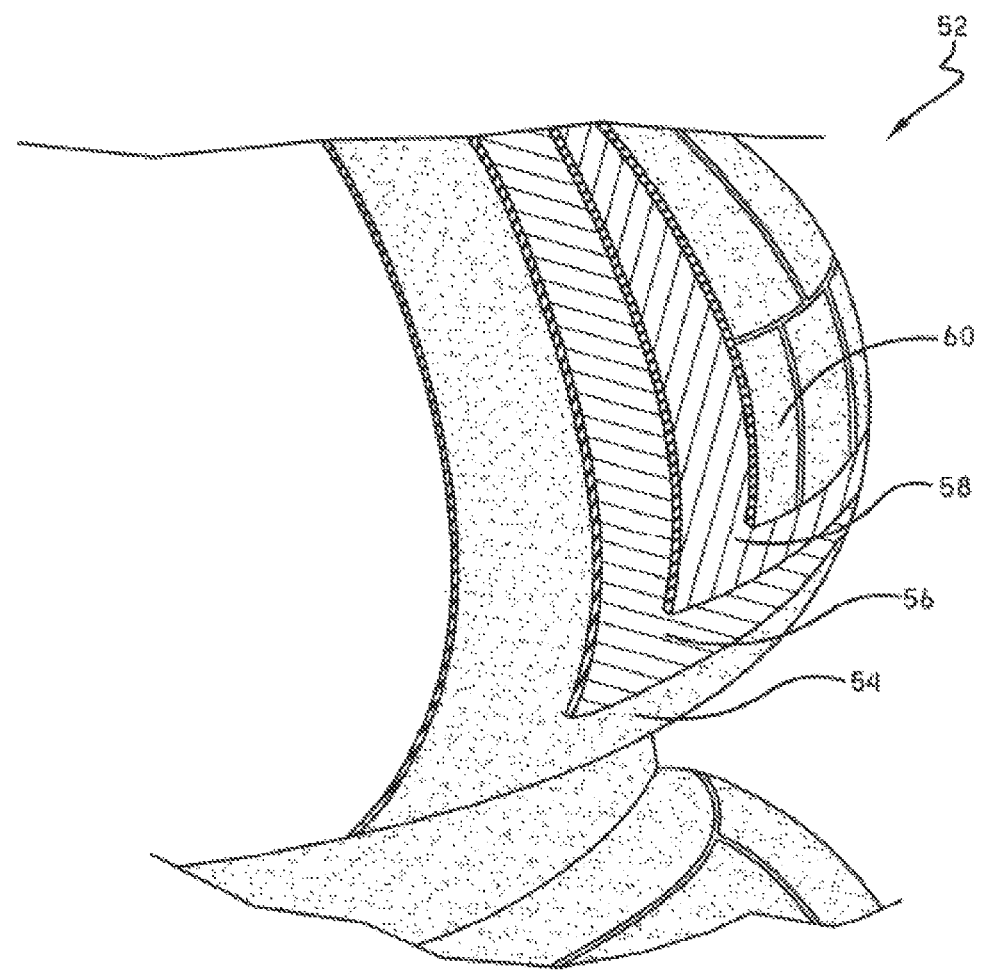
FIG. 5 is a cutaway view of an exemplary airsleeve showing its layered construction.

In one or more embodiments, airsleeves 5, 12, 32, and 72 are made of cord-(fabric or metal) reinforced elastomer and may be comprised of several layers, as shown in a cutaway view of an exemplary airsleeve 52 in FIG. 5. Exemplary airsleeve 52 features "two-ply" construction and includes four layers including: innerliner 54, first ply 56, second ply 58, and outer cover 60. Innerliner 54 and outer cover 60 may include calendared rubber. As shown, first ply 56 may include a single ply of cord-reinforced elastomer with the cords at a specific bias angle, and second ply 58 may include a single ply of fabric-reinforced elastomer with the same bias angle laid opposite that of first ply 56.

The present invention is generally described in the context of an airsleeve and an air spring, and may be used a wide variety of applications, including suspension systems for trains, automobiles, air springs used to support truck cabs, air springs used with buses, hoses, seats, and the like.

II. Vulcanizable Composition

In one or more embodiments, at least one layer of an air bellow is formed from a vulcanizable polymeric composition that includes at least one elastomer, a curative, a halogenated hydrocarbon wax, and expandable graphite. In one or more embodiments, the at least one layer prepared from the vulcanizable composition including the halogenated hydrocarbon wax and the expandable graphite is the outermost layer of the bellow (i.e. the cover layer). Those layers of the bellow that are not prepared using the vulcanizable composition including the expandable graphite and the halogenated hydrocarbon wax may be prepared by employing conventional vulcanizable compositions for preparing the various layers of the air spring bellow. U.S. Patent App. Publ. Nos. 2013/0020746 A1 and 2010/0117274 A1 are both incorporated herein by reference in this regard.

In one or more embodiments, the vulcanizable compositions employed to make the one or more layers of the air springs bellows of the invention include an elastomer, a curative, a halogenated hydrocarbon wax, expandable graphite, optionally an organic filler, optionally an inorganic filler, optionally one or more additional flame retardants, and a curative. Other optional ingredients may include, but are not limited to, plasticizers, antioxidants, oils, and other additives that are conventionally employed in rubber compositions.

A. Synergistic Fire Protection Package

1. Halogenated Hydrocarbon

In one or more embodiments, the elastomeric compositions include at least one halogenated hydrocarbon wax. Halogenated hydrocarbon flame retardants are generally described in U.S. Pat. No. 4,579,906 and U.S. Patent App. Pub. No. 2004/0138351 A1, both of which are incorporated herein by reference.

In one or more embodiments, the halogenated hydrocarbon wax may be characterized by a molecular weight of at least 50 g/mol, in other embodiments, at least 100 g/mol, in other embodiments, at least 150 g/mol, in other embodiments, at least 200 g/mol, and in other embodiments, at least 250 g/mol. In one or more embodiments, the halogenated hydrocarbon wax may be characterized by a molecular weight of at most 10,000 g/mol, in other embodiments, at most 9,000 g/mol, in other embodiments, at most 8,000 g/mol, in other embodiments, at most 7,000 g/mol, and in other embodiments, at most 6,000 g/mol, in other embodiments, at most 5,000 g/mol, in other embodiments, at most 4,000 g/mol, in other embodiments, at most 3,000 g/mol, in other embodiments, at most 2,000 g/mol, and in other embodiments, at most 1,000 g/mol. Molecular weight may be determined by conventional methods, including gel permeation chromatography.

In one or more embodiments, the halogenated hydrocarbon wax may be characterized by a softening point of from about 40 to about 150° C., in other embodiments, from about 50 to about 130° C., and in other embodiments, from about 60 to about 125° C., when measured according to ASTM D-36.

In one or more embodiments, the elastomeric compositions include at least one chlorinated hydrocarbon wax. Examples of chlorinated hydrocarbon waxes include hydrocarbon waxes having at least one chlorocarbon segment, e.g., a hydrocarbon segment in which some or all hydrogens have been replaced with chlorine atoms along the carbon chain. In certain embodiments, the chlorinated hydrocarbon wax is a chlorinated paraffin wax. Chlorinated hydrocarbon waxes that are suitable for use in the rubber compositions disclosed herein include Chlorez chlorinated waxes (available from Dover Chemical Corporation, Dover, Ohio) such as Chlorez 700, Chlorez 700-S, Chlorez 760, Chlorez 700-DD, Chlorez 700-SS, and Chlorez 700-SSNP; Chloroflo 40 (available from Dover Chemical Corporation, Dover, Ohio), Paroil chlorinated oils (available from Dover Chemical Corporation, Dover, Ohio) such as Paroil 150-LV, Paroil 10-NR and Paroil 63-NR).

Suitable chlorinated hydrocarbon waxes used in the rubber compositions disclosed herein include from 30-75% by weight chlorine based on the total weight of the wax, preferably from 40 to 75% by weight chlorine. Chlorinated hydrocarbon waxes are further described in U.S. Patent App. Publ. No. 2016/0200900 A1, which is incorporated by reference herein.

2. Expandable Graphite

Expandable graphite may also be referred to as expandable flake graphite, intumescent flake graphite, or expandable flake; and, for the purposes herein, these terms may be used interchangeably. Expandable graphite is so-named because, when heated to or above a certain temperature, often referred to as the onset temperature, the expandable graphite particles are expanded perpendicularly to the layer plane.

In one or more embodiments, the expandable graphite includes intercalated graphite, in which an intercallant material is included between the graphite layers of graphite crystals or particles. In these or other embodiments, when the expandable graphite is exposed to elevated temperatures that are at or above the onset temperature, the intercalant compound changes form, for example from liquid or solid to gas. This rapid reaction creates a force that is capable of separating the graphite layers, and may result in a significant increase in volume. This expansion is sometimes referred to as exfoliation. In one or more embodiments, the expansion volume and the onset temperature may be controlled by selecting the intercalant and adjusting parameters within the intercalation process.

Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 μm to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a median size in the range from about 30 μm to about 1.5 mm, in other embodiments from about 50 μm to about 1.0 mm, and in other embodiments from about 180 μm to about 850 μm. In certain embodiments, the expandable graphite may be characterized as having a median size of at least 30 μm, in other embodiments at least 44 μm, in other embodiments at least 180 μm, and in other embodiments at least 300 μm. In one or more embodiments, expandable graphite may be characterized as having a median size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

The change in volume of the graphite may be expressed as a ratio, and is sometimes referred to as the expansion ratio. In one or more embodiments, the expansion ratio may be expressed as the final volume, in cubic centimeters (cc), of one gram (g) of exfoliated expandable graphite. In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1.

In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1.

In certain embodiments, the expandable graphite may be characterized as having an expansion ratio (cc/g) of at most 350:1, and in yet other embodiments at most 300:1.

In one or more embodiments, the expandable graphite, as it exists within the pouch or binder component of the indicator of the present invention, is partially expanded. In one or more embodiments, the expandable graphite is not expanded, however, to a deleterious degree, which includes that amount or more of expansion that will deleteriously affect the ability to form the indicator product and the ability of the graphite to exhibit a visual change upon exposure to a critical temperature. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

Onset temperature, i.e. the temperature at which exfoliation of the graphite begins, may also be interchangeably referred to as expansion temperature. In one or more embodiments, the expandable graphite may be characterized by an onset temperature, ranging from about 100° C. to about 280° C.; in other embodiments from about 150° C. to about 260° C.; in other embodiments from about 170° C. to about 250° C.; and in other embodiments from about 160° C. to about 225° C.

In one or more embodiments, the expandable graphite may be characterized by an onset temperature of at least 100° C., in other embodiments at least 130° C., in other embodiments at least 150° C., in other embodiments at least 160° C., in other embodiments at least 170° C., and in other embodiments at least 180° C. In one or more embodiments, the expandable graphite may be characterized by an onset temperature of at least 190° C., in other embodiments at least 200° C., in other embodiments at least 210° C., and in other embodiments at least 220° C. In one or more embodiments, the expandable graphite may be characterized by an onset temperature of at most 280° C., in other embodiments at most 260° C., in other embodiments at most 250° C., and in other embodiments at most 225° C. In one or more embodiments, the onset temperature may be defined as the temperature below which there is only up to 5% volume change in the expandable graphite.

B. Polymer Component

In one or more embodiments, the elastomer includes those polymers that are capable of being cured (also referred to as vulcanized) to form elastomeric compositions of matter. Elastomers that are useful in vulcanizable compositions for air spring bellows are further described in co-pending U.S. Application Publication No. 2010/0117274 and International Application Publication No. WO 2011/0884488, both of which are incorporated herein by reference in their entirety.

Exemplary polymers include natural rubber, synthetic polyisoprene, polybutadiene, polyisobutylene-co-isoprene, polychloroprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

In one or more embodiments, the vulcanizable composition comprises unsaturated chlorinated polymer. Examples of unsaturated chlorinated polymer include polymers that derive from the polymerization of halogenated dienes and optionally monomer copolymerizable therewith. A popular halogenated diene is 2-chloro-1,3-butadiene, which is also known as chloroprene. Monomer copolymerizable with chloroprene includes sulfur and 2,3-dichloro-1,3-butadiene. Homopolymers of chloroprene are generally referred to as polychloroprene. For purposes of this description, the polymers deriving from the copolymerization of chloroprene and monomer copolymerizable therewith may be referred to as polychloroprene copolymers. Examples of polychloroprene or polychloroprene copolymers are available from DuPont Performance Elastomers (Wilmington, Del.) under the Neoprene™ "W" type family designations.

In one or more embodiments, the vulcanizable composition comprises polychloroprene, and further comprises at least one additional vulcanizable polymer selected from the group consisting of natural rubber, synthetic polyisoprene, polybutadiene, polyisobutylene-co-isoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

C. Other Ingredients

Other ingredients that may be included in the vulcanizable formulation include additional elastomers, additional flame retardants, plasticizers, antioxidants, fillers, oils, curatives, and other additives that are conventionally employed in rubber compositions.

In one or more embodiments, the vulcanizable composition of this invention may include an antioxidant. Useful antioxidants include bisphenol type antioxidants, diphenylamines, and zinc salts. Useful diphenylamine antioxidants are available under the tradename 405 (Akrochem). Useful zinc salt antioxidants are available under the tradename 58 (Akrochem).

Antidegradants protect the final product vulcanizate against damaging external influences such as oxidation, ozone, heat, and dynamic stresses. A suitable antidegradant is Wingstay 100, which is a mixed diaryl-p-phenylene type antidegradant. Another suitable antidegradant is Wingstay 29, which is a mixed para oriented styrenated diphenylamine. Wingstay 100 and Wingstay 29 are commercially available.

Another suitable antidegradant is IPPD, or N-isopropyl-N'-phenyl-p-phenylenediamine. IPPD is available through Flexsys (Akron, Ohio) under the tradename Santoflex IPPD.

Another suitable antidegradant is 6PPD, or N-(1,3-dimethylbutyl)-N-phenyl-p-phenylenediamine. 6PPD is available through Flexsys (Akron, Ohio) under the tradename Santoflex 6PPD.

In one or more embodiments, the vulcanizable composition of this invention may include low oil swell factices, or vulcanized oils. In specific embodiments, these compounds include sulfur vulcanized vegetable oils. These factices decrease compound nerve and may permit higher liquid plasticizer levels. Factices may also speed the incorporation of fillers and increase milling efficiency. A suitable factice is commercially available from Akrochem Corporation (Akron, Ohio) under the Akrofax tradename.

In one or more embodiments, plasticizers, which may also be referred to as softeners, include, but are not limited to, fatty acids, vegetable oils, petroleum products, coal tar products, pine products, esters, and resins. In particular embodiments, the plasticizers include esters such as dicapryilphthalate, butylcuminate, dibutylphthalate, butyllactate, glycerol chlorobenzoate, methylricinoleate, octyloleate, dioctylphthalate, or dioctylsebacate.

In one or more embodiments, the vulcanizable compositions of this invention may include a tackifier or tackifier resin. As is known in the art, these resins generally increase the tackiness of the composition. Natural or synthetic resins may be employed. In particular embodiments, a nitrile rubber latex is employed as a tackifier. In these or other embodiments, the tackifier may include Koresin (BASF), which is believed to be a resin of acetylene and p-t-butylphenol.

In one or more embodiments, the vulcanizable composition of this invention may include wax. Wax is a processing aid and serves as a release agent.

In one or more embodiments, the vulcanizable composition of this invention may include a low viscosity polyethylene wax. Low viscosity polyethylene wax is a release, or antisticking, agent. A useful low viscosity polyethylene wax is available from Akrochem Corporation (Akron, Ohio) under the PE-100 tradename.

In one or more embodiments, the vulcanizable composition of this invention may include a homogenizing agent. Useful homogenizing agents include Strucktol 60NS, which is a mixture of aliphatic hydrocarbon resins.

In one or more embodiments, the vulcanizable composition may include one or more flame retardants in addition to the synergistic combination described above. These additional flame retardants may be referred to as complementary flame retardants, and may generally include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

1. Alumina Trihydrate

In one or more embodiments, the complementary flame retardant may include alumina trihydrate (ATH), which may also be referred to as hydrated alumina, aluminum hydroxide, or aluminum trihydroxide. In one or more embodiments, the alumina trihydrate may be characterized by a median particle size of from about 1 micron to about 80 microns, in other embodiments, from about 5 to about 15 microns. Alumina trihydrate is commercially available, for example from Huber Engineered Materials, and from the R.J. Marshall Company.

Exemplary non-halogenated flame retardants also include magnesium hydroxide, zinc borate, ammonium polyphosphate, melamine polyphosphate, antimony oxide (Sb2O3), calcium borate, basic magnesium carbonate, gypsum, and mixtures thereof.

2. Filler

In one or more embodiments, the vulcanizable composition may include at least one filler such as inorganic and organic fillers. Examples of organic fillers include carbon black, coal filler, ground recycled rubber, and starch. Examples of inorganic fillers include silica, aluminum hydroxide, magnesium hydroxide, mica, talc (hydrated magnesium silicate), and clays (hydrated aluminum silicates). In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks. In one or more embodiments, the vulcanizable composition of this invention may include one or more reinforcing fillers and/or one or more non-reinforcing fillers.

In one or more embodiments, the vulcanizable composition of this invention may include silica. Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms of silica are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 $m^2/g$, tapped density of 230 g/liter, pH (5% in water suspension) of 7, $SiO_2$ content of 98%, $Na_2SO_4$ content of 2%, and $Al_2O_3$ content of 0.2%.

In one or more embodiments, the rubber composition may include clay. Useful clays include hydrated aluminum silicates. In one or more embodiments, useful clays can be represented by the formula $Al_2O_3 SiO_2 \cdot XH_2O$. Exemplary forms of clay include kaolinite, montmorillonite, atapulgite, illite, bentonite, halloysite, and mixtures thereof. In one embodiment, the clay is represented by the formula $Al_2O_3 SiO_2 \cdot 3H_2O$. In another embodiment, the clay is represented by the formula $Al_2O_3 SiO_2 \cdot 2H_2O$. In a preferred embodiment, the clay has a pH of about 7.0.

In one or more embodiments, various forms or grades of clays may be employed. Exemplary forms or grades of clay include air-floated clays, water-washed clays, calcined clays, and chemically modified (surface treated) clays. In other embodiments, untreated clays may be used.

Air-floated clays include hard and soft clays. In one or more embodiments, hard clays include those characterized as having a lower median particle size distribution, and higher surface area than soft clays. In one or more embodiments, soft clays include those characterized by having a higher median particle size distribution and lower surface area than hard clays. Hard and soft clays are disclosed in U.S. Pat. Nos. 5,468,550, and 5,854,327, which are incorporated herein by reference.

In one embodiment, the air-floated clays used have a pH of from about 4.0 to about 8.0, and in another embodiment, the pH is about neutral. Useful airfloated clays have an average particle size of less than about 2 microns. Typical airfloated clays have a specific gravity of around 2.6 g/cc. Airfloated clays, both hard and soft, are available through various sources.

Water washed clays include those clays that are more closely controlled for particle size by the water fractionation process. This process permits the production of clays within controlled particle size ranges. In one or more embodiments, the average particle size of the clay is less than about 2 microns in diameter. In one embodiment, the water washed kaolin clay includes hydrated aluminum silicate, and may be characterized by a pH of from about 6 to about 7.5, and a specific gravity of about 2.6 g/cc.

Calcined clays include those that result from the removal of water contained in clays (clays typically contain about 14 percent water) by calcination.

Where an inorganic filler is employed, such as silica, the inorganic filler may be used in conjunction with a coupling agent, such as a mercapto silane, to enhance interaction between the inorganic particles and the rubber, or to create a chemical bond between the inorganic particles and the rubber. In these or other embodiments, the inorganic filler may be pre-functionalized to provide similar interaction or reaction. Useful coupling agents are disclosed in U.S. Pat. Nos. 3,842,111, 3,873,489, 3,978,103, 3,997,581, 4,002, 594, 5,580,919, 5,583,245, 5,663,396, 5,674,932, 5,684,171, 5,684,172, 5,696,197, 6,579,909, 6,590,017, 6,525,118, 6,342,552, 6,608,145, 6,667,362, and 6,683,135, the disclosures of which are incorporated herein by reference.

3. Curative

In one or more embodiments, the vulcanizable composition of this invention includes a curative, or cure package. Advantageously, and contrary to conventional wisdom, peroxide curatives, which are known to produce unwanted volatile by-products, can be avoided. Curatives based upon thiadiazole, which are known to have shorter scorch times, can also be avoided.

In one or more embodiments, the vulcanizable formulations may be cured with a sulfur-based compound. The cure package may also include other optional ingredients. In one or more embodiments, the cure package includes a sulfur-based compound and one or more additives. Although one having skill in the art may appreciate other possible cure packages, an exemplary cure package includes sulfur, tetramethylthiuram disulfide (TMTD) or tetramethylthiuram monosulfide (TMTM), and zinc oxide.

Sulfurs that are soluble or insoluble in elastomers may be used. Exemplary sulfur is Crystex OT 20, polymeric sulfur that is insoluble in elastomers. At vulcanization temperatures, Crystex OT 20 de-polymerizes to soluble sulfur and behaves similarly to what is traditionally known as "rubber maker's sulfur" and fosters the crosslinking of polymer molecules. Crystex OT 20 is commercially available from Flexsys (Akron, Ohio).

TMTD and TMTM are cure accelerants that increase the rate of cure by catalyzing the addition of sulfur chains to the rubber molecules. TMTD is commercially available from Western Reserve Chemical Corporation (Stow, Ohio). Suitable accelerators also include other accelerators known in the art.

Zinc oxide acts as a cure activator in the presence of sulfur, one or more accelerators, and unsaturated rubber to help promote the formation of sulfur cross-links during the vulcanization process.

In one or more embodiments, the cure system includes one or more cure retarders, which serve to slow the cure rate and ideally provide a marching cure profile. In particular embodiments, the cure rate of the inner and outer layers is slowed to match the cure rate of the core (i.e., cord-containing) layers. In one or more embodiments, the vulcanizable compositions of this invention are manipulated to achieve a $t_{50}$ of from about 5 to about 20 minutes, in other embodiments from about 7.5 to about 19 minutes, in other embodiments from about 10 to about 18 minutes, at 155° C. as determined by standard techniques using a moving die rheometer (MDR). In these or other embodiments, the vulcanizable compositions of this invention are manipulated to achieve a $t_{90}$ of from about 20 to about 45 minutes, or in other embodiments from about 21 to about 40 minutes, in other embodiments from about 25 to about 38 minutes at 155° C. In these or other embodiments, the vulcanizable compositions of this invention are manipulated to achieve a $t_{100}$ of at least 30 minutes.

In one or more embodiments, the vulcanizable composition of this invention may include stearic acid. Stearic acid (octadecanoic acid) is a waxy solid and has the chemical formula $C_{18}H_{36}O_2$. Stearic acid is particularly effective as a processing aid in minimizing mill and calendar roll sticking.

In one or more embodiments, the vulcanizable composition of this invention may include magnesium oxide (MgO). The primary function of magnesium oxide is to neutralize trace hydrogen chloride that may be liberated by the polymer during processing, vulcanization heat aging or service. By removing the hydrogen chloride, magnesium oxide prevents auto-catalytic decomposition resulting in greater stability. Magnesium oxide may also take part in the crosslinking process.

D. Amounts

As is conventional in the art, the rubber component of the composition refers to the elastomer system or elastomeric component of the vulcanizable composition, or in other words, the rubber component includes those polymers that, upon vulcanization, form part of the elastomeric network.

1. Rubber

In one or more embodiments, the vulcanizable compositions employed in practicing the present invention include a sufficient amount of vulcanizable rubber so as to achieve a technologically useful airsleeve of an air spring. In one or more embodiments, the overall vulcanizable composition of matter includes at least 25% by weight, in other embodiments at least 30% by weight, in other embodiments at least 35% by weight, in other embodiments at least 40% by weight, and in other embodiments at least 45% by weight vulcanizable rubber, based upon the total weight of the vulcanizable composition. In these or other embodiments, the overall vulcanizable composition of matter includes less than 99%, in other embodiments less than 90%, and in other embodiments less than 75% by weight vulcanizable rubber, based upon the total weight of the vulcanizable composition.

Advantageously, the present invention provides airspring airsleeves that have reduced polymer content, when compared to conventional airsleeves, said reduced-polymer airsleeves having good flame retardancy and also good dynamic and mechanical properties. Thus, in one or more embodiments, the amount of vulcanizable rubber in the vulcanizable compositions is from about 25 to about 40% by weight, based upon the total weight of the vulcanizable composition.

In one or more embodiments, at least 80%, in other embodiments at least 90%, and in other embodiments at least 95% of the rubber component of the vulcanizable composition comprises polychloroprene or polychloroprene copolymers. In one or more embodiments, the balance of the rubber component of the vulcanizable composition comprises natural rubber or a blend of natural rubber and a diene polymer.

2. Halogentated Hydrocarbon

One or more amounts are based upon parts by weight (pbw) per hundred rubber (phr) as a unit of measure. In one or more embodiments, the vulcanizable compositions may include at least 0.2 pbw phr, in other embodiments at least 0.5 pbw, and in other embodiments at least 9 pbw phr halogenated hydrocarbon. In these or other embodiments, the vulcanizable compositions may include less than 25 pbw phr, in other embodiments less than 20 pbw, and in other embodiments less than 15 pbw phr halogenated hydrocarbon. In certain embodiments, the rubber compositions disclosed herein comprise from 0.2 to 25 phr, preferably from 0.5 to 20 phr, or 1 to 15 phr of at least one chlorinated hydrocarbon wax.

In one or more embodiments, the vulcanizable compositions may include at least 0.2 pbw phr, in other embodiments at least 0.5 pbw, and in other embodiments at least 9 pbw phr chlorinated paraffin wax. In these or other embodiments, the vulcanizable compositions may include less than 25 pbw phr, in other embodiments less than 20 pbw, and in other embodiments less than 15 pbw phr chlorinated paraffin wax.

In certain embodiments, the rubber compositions disclosed herein comprise from 0.2 to 25 phr, preferably from 0.5 to 20 phr, or 1 to 15 phr of at least one chlorinated hydrocarbon wax.

Accordingly, because suitable chlorinated hydrocarbon waxes that are utilized may contain varying amounts of chlorine, it should be understood that the total amount of chlorination added to the rubber composition can be varied by adjusting the amount (phr) of chlorinated hydrocarbon wax added to the rubber composition and/or the chlorine content of the chlorinated hydrocarbon wax added to the rubber composition. Therefore, the total amount of chlorination added to the rubber composition may vary from 0.005 to 7.5 phr (parts chlorine per hundred parts rubber in the rubber composition). In certain embodiments utilizing chlorinated hydrocarbon wax, the amount of chlorination added to the rubber composition is from 1 to 4 phr.

3. Alumina Trihydrate

In one or more embodiments, the vulcanizable compositions may include 0 pbw, in other embodiments at least 0.1 pbw, and in other embodiments at least 0.5 pbw alumina trihydrate, based on 100 parts by weight rubber (phr). In these or other embodiments, the vulcanizable compositions may include less than 20 pbw, in other embodiments less than 15 pbw, and in other embodiments less than 10 pbw alumina trihydrate phr. In these or other embodiments, the vulcanizable compositions may include from about 0 to about 20 pbw, in other embodiments from about 0.1 to about 15 pbw, and in other embodiments from about 0.5 to about 10 pbw alumina trihydrate, based on 100 parts by weight rubber (phr).

4. Expandable Graphite

In one or more embodiments, the vulcanizable compositions may include at least 0.5 pbw, in other embodiments at least 1 pbw, and in other embodiments at least 5 pbw expandable graphite, based on 100 parts by weight rubber (phr). In these or other embodiments, the vulcanizable compositions may include less than 40 pbw, in other embodiments less than 35 pbw, and in other embodiments less than 30 pbw expandable graphite phr. In these or other embodiments, the vulcanizable compositions may include from about 0.5 to about 40 pbw, in other embodiments from about 1 to about 35 pbw, and in other embodiments from about 5 to about 30 pbw expandable graphite, based on 100 parts by weight rubber (phr).

5. Plasticizer

In certain embodiments, the vulcanizable composition of this invention is devoid of plasticizer. In one or more embodiments, the vulcanizable compositions may include at least 7 pbw, in other embodiments at least 10 pbw, and in other embodiments at least 12 pbw plasticizer, based on 100 parts by weight rubber (phr). In these or other embodiments, the vulcanizable compositions may include less than 100 pbw, in other embodiments less than 90 pbw, and in other embodiments less than 80 pbw plasticizer phr. In these or other embodiments, the vulcanizable compositions may include from about 0 to about 100 pbw, in other embodiments from about 10 to about 90 pbw, and in other embodiments from about 12 to about 80 pbw plasticizer, based on 100 parts by weight rubber (phr).

6. Carbon Black

In one or more embodiments, the vulcanizable composition may include at least about 20, in other embodiments at least about 30, and in other embodiments at least about 40 pbw carbon black phr. In one or more embodiments, the vulcanizable composition may include less than about 100, in other embodiments less than about 75, and in other embodiments less than about 50 pbw carbon black phr.

7. Silica

In one or more embodiments, the vulcanizable composition may include at least 15, in other embodiments at least 20, and in other embodiments at least 25 pbw silica phr. In one or more embodiments the vulcanizable composition may include less than 250, in other embodiments less than 200, in other embodiments less than 90, and in other embodiments less than 80 pbw silica phr. Where both carbon black and silica are employed, the weight ratio of carbon black to silica may range from 9:1 to 0.5:1, in other embodiments from 5:1 to 1:1, and in other embodiments from 4:1 to 2:1.

8. Factice

In certain embodiments, the vulcanizable composition of this invention is devoid of factice. In one or more embodiments, the vulcanizable composition may include at least about 1, in other embodiments at least about 2, and in other embodiments at least about 3 pbw factice phr. In one or more embodiments, the vulcanizable composition may include less than about 10, in other embodiments less than about 8, and in other embodiments less than about 6 pbw factice phr.

9. Tackifier

In certain embodiments, the vulcanizable composition of this invention is devoid of tackifiers. In certain embodiments, the vulcanizable composition of this invention may include at least 1 part by weight, in other embodiments at least 2 parts by weight, in other embodiments at least 4 parts by weight tackifier phr.

In these or other embodiments, the vulcanizable composition may include less than 10 pbw, in other embodiments less than 8 pbw, in other embodiments less than 5 pbw tackifier phr. In these or other embodiments, the vulcanizable compositions may include from about 0 to about 10 pbw, in other embodiments from about 1 to about 8 tackifier phr.

10. Homogenizing Agent

In certain embodiments, the vulcanizable composition of this invention optionally includes at least 1 part by weight homogenizing agent phr, in other embodiments at least 2 parts by weight, in other embodiments at least 4 parts by weight, in other embodiments at least 5 parts by weight, in other embodiments at least 6 parts by weight, in other embodiments at least 7 parts by weight, in other embodiments at least 8 parts by weight, in other embodiments at least 9 parts by weight, and in other embodiments at least 10 parts by weight homogenizing agent phr.

In these or other embodiments, the vulcanizable composition may include less than 20 pbw, in other embodiments less than 18 pbw, in other embodiments less than 16 pbw, in other embodiments less than 14 pbw, and in other embodiments less than 12 pbw homogenizing agent phr.

11. Curatives

Those skilled in the art will be able to select an appropriate amount of the sulfur-based curative and complementary cure agents in order to achieve a desired level of cure. In one or more embodiments, the amount of sulfur is at least 0.1 phr, in other embodiments, at least 0.5 phr. In one or more embodiments, the amount of sulfur is less than 8 phr, in other embodiments, less than 5 phr.

12. Zinc Oxide

In one or more embodiments, the amount of zinc oxide is at least 0.5 phr, in other embodiments, at least 0.75 phr, in other embodiments, at least 1 phr, and in other embodiments, at least 2 phr. In one or more embodiments, the amount of zinc oxide is less than 8 phr, in other embodiments, less than 5 phr, in other embodiments, less than 4 phr, in other embodiments, less than 3 phr, and in other embodiments, less than 2 phr. In one or more embodiments, the amount of zinc oxide is from about 1 to about 3 phr, in other embodiments, the amount of zinc oxide is from about 0.5 to about 2 phr.

13. Antioxidants

In one or more embodiments, the amount of antioxidants is from about 1 to about 5 phr. In one or more embodiments, the amount of antiozonants is from about 1 to about 5 phr. In one or more embodiments, the amount of accelerators is from about 0.1 to about 4 phr.

14. Clay

In one or more embodiments, the vulcanizable composition may include at least about 20, in other embodiments at least about 30, and in other embodiments at least about 40 pbw clay phr. In one or more embodiments, the vulcanizable composition may include less than about 100, in other embodiments less than about 75, and in other embodiments less than about 50 pbw clay phr.

III. Method of Preparation

The compositions for preparing one or more layers of airsleeve according to the present invention can be prepared by conventional manufacturing techniques including standard rubber shaping, molding and curing techniques. The cured or crosslinked compositions may be referred to as vulcanizates, which generally contain three-dimensional polymeric networks that are thermoset. The other ingredients, such as fillers and processing aids, may be evenly dispersed throughout the crosslinked network. The mixing process may employ conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients such as polymer, fire retardants, carbon black, etc. can be first loaded followed by the unsaturated polymer. In other embodiments, where unsaturated polymer is employed, the unsaturated polymer may be added first, followed by the other ingredients. In even other embodiments, unsaturated polymer may be added at the same time as one or more of the other ingredients.

Mixing cycles generally range from about 2 to 10 minutes. In certain embodiments, an incremental procedure can be used whereby the polymer and part of the ingredients are added first, and the remaining ingredients are added in additional increments. In one or more embodiments, two-stage mixing can be employed.

When utilizing an internal mixer, the dry or powdery materials such as the carbon black can be added first, followed by the processing aids and finally the polymer to form the masterbatch. The cure package (sulfur, accelerants, antidegradants, etc.) can be added near the end of the mixing cycle and at lower temperatures to prevent premature crosslinking of the polymer. In other embodiments, the cure package can be added to the masterbatch in order to improve dispersion.

Once mixed, the composition can be then formed into a sheet via calendaring or combined with a reinforcing cord (fabric or metal). The compositions of the invention can also be formed into various types of articles using other techniques such as extrusion.

The vulcanizable compositions of the present invention can be formed into airsleeves of air springs by employing conventional techniques for fabricating and manufacturing air springs. Air spring and air sleeve constructions and methods of their manufacture are known in the art as exemplified in U.S. Pat. Nos. 7,250,203, 5,527,170, and 6,439,550, which are incorporated herein by reference.

In one or more embodiments, air springs prepared according to the present invention exhibit improved fire retardant properties, when compared to air springs prepared from compositions that do not contain the synergistic fire protection package that is described herein. In one or more embodiments, air springs prepared according to the present invention exhibit improved fire retardant properties, including one or more properties of reduced flame spread, reduced heat release, reduced smoke toxicity, reduced smoke density, and reduced smoke emission.

Embodiments of the airspring airsleeves of the present invention are suitable for use in railway applications, and meet or exceed the requirements for fire behavior for materials and components used in those and other applications. Advantageously, one or more embodiments of airspring airsleeves that are prepared according to the present invention meet or exceed the European Standard EN 45545-2: 2013+A1 (October 2015) for group R9 materials. Embodiments of the invention meet or exceed the requirements for R9 materials when tested by ISO 5659-2 for smoke production. Embodiments of the invention meet or exceed the requirements for R9 materials when tested by ISO 5660-1 & 2 for cone calorimeter, heat release and smoke production. Heat release is sometimes expressed as the maximum average rate of heat emission (MAHRE).

Various modifications and alterations that do not depart from the scope and spirit of this invention will become apparent to those skilled in the art. This invention is not to be duly limited to the illustrative embodiments set forth herein.

What is claimed is:

1. An air spring having an airsleeve, wherein at least one layer of said airsleeve includes the vulcanization product of a composition that includes
    at least one vulcanizable polymer;
    a curative;
    at least one halogenated hydrocarbon wax; and
    expandable graphite, where the total amount of vulcanizable polymer is from about 25 to about 40 wt. %, based upon the total weight of the composition.

2. The air spring of claim 1, where the at least one vulcanizable polymer comprises polychloroprene.

3. The air spring of claim 1, where the at least one vulcanizable polymer comprises polychloroprene, and where the composition further comprises at least one additional vulcanizable polymer selected from the group consisting of natural rubber, synthetic polyisoprene, polybutadiene, polyisobutylene-co-isoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

4. The air spring of claim 1, where the at least one halogenated hydrocarbon wax is present in an amount of from about 0.2 parts by weight to about 25 parts by weight, based upon one hundred parts by weight rubber.

5. The air spring of claim 1, where the composition comprises from about 0.5 parts by weight to about 40 parts by weight expandable graphite, based upon one hundred parts by weight rubber.

6. The air spring of claim 1, where the composition further comprises from about 0.1 parts by weight to about 20 parts by weight alumina trihydrate, based upon one hundred parts by weight rubber.

7. The air spring of claim 1, where the composition further comprises from about 20 parts by weight to about 100 parts by weight clay, based upon one hundred parts by weight rubber.

8. An air bellow prepared by a process comprising the steps of:
   (i) preparing a vulcanizable composition that includes at least one vulcanizable polymer, a curative, at least one halogenated hydrocarbon wax, and expandable graphite, where the total amount of vulcanizable polymer is from about 25 to about 40 wt. %, based upon the total weight of the composition;
   (ii) fabricating an uncured air bellow comprising at least one layer that is formed from said vulcanizable composition; and
   (iii) at least partially curing the uncured air bellow.

9. The air bellow of claim 8, where the vulcanizable composition further comprises from about 0.1 parts by weight to about 20 parts by weight alumina trihydrate, based upon one hundred parts by weight rubber.

10. The air bellow of claim 8, where the composition further comprises from about 20 parts by weight to about 100 parts by weight clay, based upon one hundred parts by weight rubber.

11. The air bellow of claim 8, where the composition further comprises carbon black.

12. The air bellow of claim 8, where the composition further comprises silica.

13. The air bellow of claim 8, where the composition further comprises factice.

14. The air bellow of claim 8, where the composition further comprises one or more plasticizers.

15. The air bellow of claim 8, where the composition further comprises one or more homogenizing agents.

16. The air bellow of claim 8, where the composition further comprises one or more antioxidants.

17. The air bellow of claim 8, where the composition further comprises zinc oxide.

18. The air bellow of claim 8, where the composition further comprises one or more tackifiers.

19. An air spring having an airsleeve, wherein at least one layer of said airsleeve includes the vulcanization product of a composition that includes:
   (i) at least one vulcanizable polymer that is selected from the group consisting of polychloroprene, polychloroprene copolymers, natural rubber, blends of natural rubber and a diene polymer, and combinations thereof;
   (ii) a curative;
   (iii) at least one halogenated hydrocarbon wax; and
   (iv) expandable graphite, where the total amount of vulcanizable polymer is from about 25 to about 40 wt %, based upon the total weight of the composition.

* * * * *